United States Patent [19]

Erdmannsdörfer et al.

[11] Patent Number: 4,948,549
[45] Date of Patent: Aug. 14, 1990

[54] PROCESS FOR PRODUCING SOOT FILTER ELEMENTS

[75] Inventors: Hans Erdmannsdörfer; Helmuth Fischer, both of Ludwigsburg; Helmut Röcker, Löchgau; Hartmut Wolff, Remseck; Fritz Zundel, Besigheim, all of Fed. Rep. of Germany

[73] Assignee: Filterwerk Mann & Hummel GmbH, Ludwigsburg, Fed. Rep. of Germany

[21] Appl. No.: 235,440

[22] Filed: Aug. 23, 1988

[30] Foreign Application Priority Data

Sep. 4, 1987 [DE] Fed. Rep. of Germany ....... 3729659

[51] Int. Cl.5 .................................................. D02J 3/02
[52] U.S. Cl. ...................................... 264/555; 264/101; 264/103; 264/162; 264/288.8; 264/290.7; 264/292; 264/293; 28/219; 28/299
[58] Field of Search ............ 264/103, 162, 571, 288.8, 264/290.5, 290.7, 293, 292, 294, 555, 101; 28/219, 220, 299; 242/174, 54.4; 210/497.01

[56] References Cited

U.S. PATENT DOCUMENTS

| 1,957,508 | 5/1934 | Taylor | 264/162 |
| 3,229,347 | 1/1966 | Tlamicha | 28/219 |
| 3,499,195 | 3/1970 | Wethington | 28/219 |
| 3,594,881 | 7/1971 | Barber et al. | 264/162 |
| 3,831,360 | 8/1974 | Horvath | 28/219 |

*Primary Examiner*—Hubert C. Lorin
*Attorney, Agent, or Firm*—Foley & Lardner, Schwartz, Jeffery, Schwaab, Mack, Blumenthal & Evans

[57] ABSTRACT

A process is described for producing filter elements which contain a cross-wound yarn as the filter material, wherein twisted yarn of fine individual fibers is roughened to enhance its filtering action. The yarn may be heat-resistant and the filter element may be used as a soot filter in the exhaust gas stream of an internal combustion engine. Before the yarn is wound up, fiber tufts are broken up by pulling the yarn under tension over a moving roughening surface, the direction of movement of the roughening surface differing by an angle alpha from the direction of movement of the yarn in the area of contact between the yarn and the roughening surface, and the angle alpha being selected in relation to the twist of the yarn, particularly so that the threads of the yarn in contact with the roughening surface are oriented transversely to the direction of movement of the roughening surface. The process produces a roughened yarn which provides the required high filter performance for a soot filter.

13 Claims, 1 Drawing Sheet

PROCESS FOR PRODUCING SOOT FILTER ELEMENTS

BACKGROUND OF THE INVENTION

The present invention relates to a process for producing filters which contain as the filter material a roughened, cross-wound yarn of fine individual fibers. The invention is particularly applicable to production of soot filters formed of heat-resistant yarn. Soot filters of this type are preferably used in the exhaust gas stream of an internal combustion engine.

U.S. Pat. No. 4,324,572 discloses soot filters comprising roughened silicon dioxide fibers cross-wound onto supporting tubes. To produce the individual soot filter elements it is thus necessary to subject the corresponding fiber to a treatment which, on the one hand, produces an adequate filter performance and on the other makes possible inexpensive manufacture.

It is known in textile processing, for example from German Offenlegungsschrift No. 3,335,752, to produce yarn effects by roughening yarns with roughening rollers, but yarns processed in this way are not suitable for the significantly higher technical requirements of the filter industry. Consequently, existing yarn roughening processes from the textile field are not readily transferable to filter yarns. With the known textile yarn processes it is simply not possible to roughen any heat-resistant yarn in such a way that it exhibits a sufficient filtering action for a soot filter.

SUMMARY OF THE INVENTION

It is therefore an object of the present invention to provide an improved process for producing a filter element formed of cross-wound, roughened yarn.

Another object of the present invention is to provide a process for producing a wound filter of yarn treated to exhibit a high degree of filtering action.

A further object of the invention is to provide an improved process for producing a filter element of heat resistant material suitable for use in a soot filter for the exhaust of an internal combustion engine.

It is also an object of the invention to provide a process for producing a soot filter element which is simple, reliable and inexpensive to carry out.

It is a particular object of the invention to provide a process for producing a filter element formed of cross-wound, roughened, heat-resistant yarn which give an adequate filter performance for a soot filter in the exhaust gas stream of an internal combustion engine.

These and other objects of the invention are achieved by providing a process for producing a filter element comprising the steps of: (a) forming a yarn by twisting fine individual fibers into threads and then twisting the threads into a yarn counter to the twist of the fibers in the threads; (b) roughening the yarn by pulling the yarn under tension over a moving roughening surface to break up fiber tufts, the direction of movement of the roughening surface differing by an angle alpha from the direction of movement of the yarn in the area of contact between the yarn and the roughening surface, said angle alpha being selected in relation to the twist of the yarn; and (c) cross-winding the roughened yarn into a filter element.

According to particularly preferred aspects of the invention, the angle alpha is less than 90° and is selected so that the threads in the portion of the yarn in contact with the roughening surface extend substantially transversely to the direction of movement of the roughening surface.

BRIEF DESCRIPTION OF THE DRAWINGS

The invention will be explained in further detail with reference to the accompanying drawings in which.

DETAILED DESCRIPTION OF PREFERRED EMBODIMENT

Figure 1:
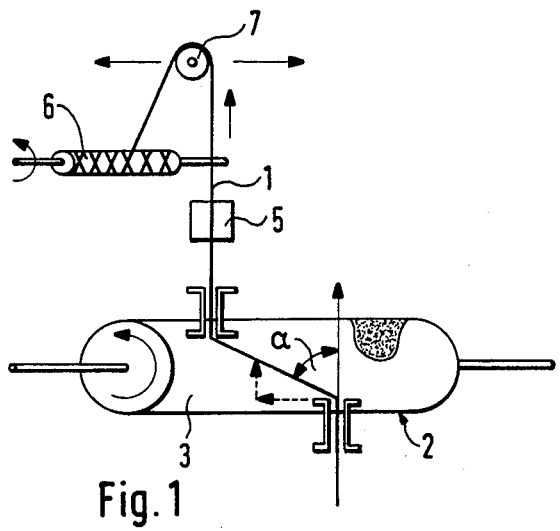
FIG. 1 is a schematic plan view illustration of a yarn being guided over a roughening roll in accordance with the present invention.

According to the invention: (a) the fine individual fibers in the yarn are twisted into threads which in turn are twisted into the yarn against the twist of the individual fibers, and (b) before the yarn is wound up, fiber tufts are broken up by pulling the yarn under tension over a moving roughening surface, the direction of movement of the roughening surface and the direction of movement of the yarn in the area of contact between the yarn and the roughening surface being determined as a function of the twist of the yarn.

The heat-resistant yarn, which comprises a plurality of individual fibers twisted against one another in groups, requires this so-called twist for reasons of strength, in particular because of damage to the yarn surface. Depending on its direction, this twist is referred to as S- or Z-twist (sometimes also as S- or Z-lay). The direction of twist of the individual fibers relative to the direction of the threads is thereby always opposite to the Z- or S-twisting of the threads to produce the final yarn. As a result it is possible that, at the surface of the yarn, tufts or bundles of fibers can be broken up by the roughness of the roughening surface. It is important thereby that the yarn is maintained under tension so that a defined roughening is possible. As a result of the tensile force applied to the yarn, the fibers from the broken up tufts spread out, so that a yarn is produced which, at least in individual surface areas, has the outwardly extended fibers necessary for subsequent filtering action. By moving the roughening surface, the roughening can be enhanced and speeded up. It is thereby important that the tuft-wise break up of the yarn take place substantially at the surface of the yarn, since otherwise the strength of the yarn is no longer assured. By varying the possible twists of the yarn (S- or Z-twists) and also the number of turns per meter of the yarn, it has been found that the angle alpha between the direction of movement of the roughening surface and the direction of movement of the yarn in the area of contact between the yarn and the roughening surface has an effect on the filter performance of a wound filter produced from the roughened yarn.

The moving roughening surface may comprise a roughening disk, a roughening roll or any other suitable roughening surface. All that is important is that the appropriate relationships are maintained in the area of contact between the yarn and the roughening surface.

Advantageously, the angle alpha is selected in such a way that in the portion of the yarn which comes into contact with the roughening surface, the threads extend transversely or substantially crosswise to the direction of movement of the roughening surface. It has been found that when this requirement is not fulfilled, the yarn may be roughened to a greater or lesser extent, but the subsequently produced wound filter element does not necessarily have the required filter characteristics. The angle alpha is thus highly dependent on which yarn twist is chosen. Secondarily, it is also important how many turns the twisted yarn has per meter of yarn length since this affects the twist angle or pitch of the threads.

It has proved to be particularly advantageous to use a roughening roll, in which case the yarn is advantageously guided over an arcuate surface. This has the advantage that the movement of the roughening surface can be easily achieved, and in addition, by means of the circular arc surface, a roughening process which depends on the roughness of the of the surface can be carried out in accordance with desired requirements.

Advantageously, the angle alpha is less than 90°, so that the direction of movement of the roughening surface corresponds to a component direction of the direction of movement of the yarn. It has been found thereby that good roughening is obtained in particular when there is a difference in speed between the speed at which the yarn is pulled and the speed at which the roughening surface is moved lying in the range from 0.7 m/sec to 7 m/sec.

To improve the degree of roughening, which may be necessary depending on the type of yarn used, following the roughening surface, the broken up fibers can be spread out in a high-speed air stream into individual fibers extending away from the yarn. The speed of this air stream at the surface of the yarn preferably may amount to at least 50 m/sec and at most 200 m/sec. The air stream has the effect of spreading out any broken up fibers lying adjacent the yarn and of blowing away any individual loose fibers which might impair filter performance. In order to achieve a particularly effective fanning out of the broken up fibers, the yarn is advantageously moved in its longitudinal direction and substantially transversely to the air stream. In order to obtain a particularly effective air stream, it is advantageous to blow air at the yarn by means of one or more nozzles distributed around the circumference of the yarn.

By vacuuming away loose fiber pieces it is possible on the one hand to prevent these pieces passing into the environment and, in addition, to avoid frequent interruption due to the installation becoming clogged with loose fiber pieces.

By means of the process according to the invention it is thus possible to produce soot filter elements which are capable of achieving an efficient filter performance while at the same time being produced in a continuous and inexpensive manner, and which can be used as an effective soot filter in the exhaust gas stream of an internal combustion engine.

As illustrated in FIG. 1, a yarn 1 is pulled in the direction of the arrow at an inclined angle over a rotating roughening roll 2. The direction of rotation of the roughening roll corresponds to the general direction in which the yarn is pulled, so that in the area of roughening surface 3 the direction of movement of yarn 1 has a component which corresponds to the direction of rotation of the roughening surface. Consequently, the angle alpha between the direction of movement of the roughening surface and the direction of movement of the yarn in the area where the yarn is in contact is less than 90°. Reference numeral 5 identifies a blowing and vacuuming (suction) apparatus which, depending on the nature of the yarn, may contribute to the spreading out of the fibers. The roughened yarn is wound via a horizontally movable deflecting roller 7 into a cross-wound soot filter element 6.

Figure 2:
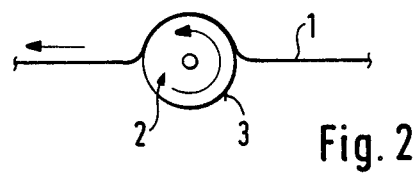
FIG. 2 is a schematic end view illustration of the roughening roll with the yarn guided thereover.

FIG. 2 shows the end face of roughening roll 2 across which the yarn is being pulled over a circular arc surface in order to obtain the largest possible roughening area. By simultaneously guiding the yarn at an inclined angle as shown in FIG. 1, any tendency of the roughening surface 3 to wear in only a narrow section is additionally avoided.

Figure 3:
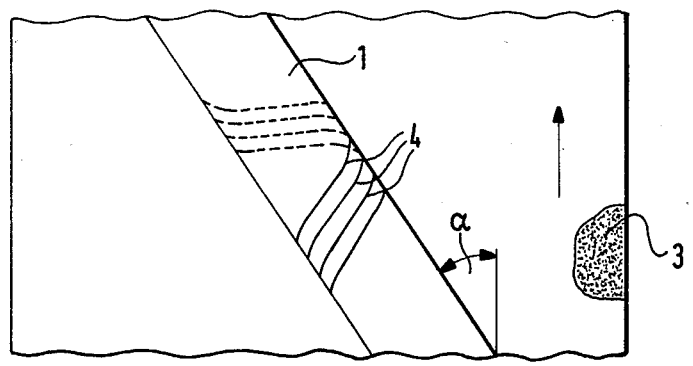
FIG. 3 is an enlarged schematic detail illustration of the roughening surface showing the twist of the threads in the yarn.

FIG. 3 shows an enlarged sectional illustration of a part of the roughening surface 3 across which the yarn 1 is being pulled. Yarn 1 is comprised of individual threads 4 which in turn are comprised of individual twisted fibers which are not shown. The yarn twist depicted here is the so-called Z-twist, since the thread direction corresponds to the middle portion of the letter Z. On the back of the yarn, the threads 4 then extend in the direction shown in broken lines. It can be seen that with the illustrated angle alpha, the threads 4 which come into contact with the roughening surface 3 extend transversely to the direction of movement of the roughening surface indicated by the arrow. With the illustrated twist and number of turns per meter of yarn, such an orientation would not be ensured at any other angle alpha, so that consequently the filtering action of the roughened yarn could deteriorate if a different angle alpha were used. It is to be expected that the best roughening results will be achieved when the orientation of the threads is essentially perpendicular to the direction of movement of the roughening surface. However, orientations differing for technical reasons from this optimal position may have only a small effect on the roughened yarn and hence on filter performance.

The foregoing description has been set forth merely to illustrate the invention and is not intended to be limiting. Since modifications of the described embodiments incorporating the spirit and substance of the invention may occur to persons skilled in the art, the scope of the invention should be limited solely with reference to the appended claims and equivalents.

What is claimed is:

1. A process for producing a filter element comprising the steps of:
   (a) forming a yarn by twisting fine individual fibers into threads and then twisting the threads into a yarn counter to the twist of the fibers in the threads;
   (b) roughening the yarn by pulling the yarn under tension over a moving roughening surface to break up fiber tufts, said roughening surface comprising the surface of a roughening roll, the direction of movement of the roughening surface differing by an angle alpha from the direction of movement of the yarn in the area of contact between the yarn and the roughening surface, said angle alpha being selected in relation to the twist of the yarn so that the threads in the portion of the yarn in contact with the roughening surface are oriented essentially perpendicularly to the direction of movement of the roughening surface; and
   (c) cross-winding the roughened yarn into a filter element.

2. A process as claimed in claim 1, wherein the yarn is guided over a semicircular roughening surface.

3. A process as claimed in claim 1, wherein said angle alpha is less than 90°.

4. A process as claimed in claim 5, wherein said yarn is pulled at a speed which differs from the speed of movement of the roughening surface by an amount lying in the range from 0.7 m/sec to 7 m/sec.

5. A process for producing a filter element comprising the steps of:
   (a) forming a yarn by twisting fine individual fibers into threads and then twisting the threads into a yarn counter to the twist of the fibers in the threads;
   (b) roughening the yarn by pulling the yarn under tension over a moving roughening surface to break up fiber tufts, the direction of movement of the roughening surface differing by an angle alpha from the direction of movement of the yarn in the area of contact between the yarn and the roughening surface, said angle alpha being selected in relation to the twist of the yarn; and
   (c) cross-winding the roughened yarn into a filter element;
   wherein after the roughening step, broken-up fiber tufts are spread out in a high-speed air streams into individual fibers extending away from the yarn.

6. A process as claimed in claim 5, wherein the speed of the air stream at the surface of the yarn is not less than 50 m/sec and not more than 200 m/sec.

7. A process as claimed in claim 5, wherein the roughened yarn with broken-up tufts is moved in a longitudinal direction essentially perpendicular to said air stream.

8. A process as claimed in claim 5, wherein a stream of air is directed at the yarn from a plurality of nozzles distributed around the circumference of the yarn.

9. A process as claimed in claim 1, wherein fiber dust produced in the course of the roughening step is removed by vacuuming it away prior to the cross-winding step.

10. A process according to claim 1, wherein said yarn is a heat-resistant yarn formed from fibers of heat-resistant material, and said filter element is a soot filter element.

11. A process for producing a filter element comprising the steps of:
   (a) roughening a yarn formed by twisting fine individual fibers into threads and then twisting the threads into a yarn counter to the twist of the fibers in the threads, said roughening being effected by pulling the yarn under tension over a moving roughening surface to break up fiber tufts at the yarn surface, the direction of movement of the roughening surface differing by an angle alpha from the direction in which the yarn is pulled in the area of contact between the yarn and the roughening surface, and said angle alpha being selected in relation to the twist of the yarn so that the threads of said yarn in contact with said roughening surface are oriented transversely to the direction of movement of said roughening surface; and
   (b) cross-winding the roughened yarn into a filter element.

12. A process as claimed in claim 11, wherein said fibers are fibers of heat-resistant material and said filter element is a soot filter element for the exhaust gas of an internal combustion engine.

13. A process for producing a filter element comprising the steps of:
   (a) roughening a yarn formed by twisting fine individual fibers into threads and then twisting the threads into a yarn counter to the twist of the fibers in the threads, said roughening being effected by pulling the yarn under tension over a moving roughening surface to break up fiber tufts at the yarn surface, the direction of movement of the roughening surface differing by an angle alpha from the direction in which the yarn is pulled in the area of contact between the yarn and the roughening surface, and said angle alpha being selected in relation to the twist of the yarn so that the threads of said yarn is contact with said roughening surface are oriented transversely to the direction of movement of said roughening surface; and
   (b) cross-winding the roughened yarn into a filter element;
   wherein said threads of the yarn which contact said roughening surface are oriented essentially perpendicularly to the direction of movement of said roughening surface.

* * * * *